United States Patent [19]
Stevens

[11] 3,747,875
[45] July 24, 1973

[54] V/STOL AIRCRAFT-BY-PASS ENGINE HAVING A DOUBLE, THRUST DIVERTER VALVE ASSEMBLY

[75] Inventor: Emerson W. Stevens, Snyder, N.Y.

[73] Assignee: The United States of America as represented by the Secretary of the Air Force, Washington, D.C.

[22] Filed: Nov. 4, 1971

[21] Appl. No.: 195,601

[52] U.S. Cl....... 244/53 R, 239/265.43, 239/265.29
[51] Int. Cl............................................ B64d 31/00
[58] Field of Search ................. 244/53 R, 52, 23 B, 244/23 D, 23 R, 12 B, 12 D, 12 R; 239/265.29, 265.43, 265.19; 60/226; 251/5

[56] References Cited
UNITED STATES PATENTS

| | | | |
|---|---|---|---|
| 3,482,804 | 12/1969 | Pyptiuk | 60/226 |
| 3,611,724 | 10/1971 | Kutney | 137/15.1 |
| 2,982,511 | 5/1961 | Connor | 251/5 |

Primary Examiner—Milton Buchler
Assistant Examiner—S. D. Basinger
Attorney—Harry A. Herbert, Jr. et al.

[57] ABSTRACT

A double, thrust diverter valve assembly for a by-pass engine applicable to the VTOL and V/STOL-types of aircraft and having a by-pass annulus and fan for directing the flow of bypass air thereinto, and in which an inflatable valve mechanism, operated from a compressed air source and mounted in a first, thrust-augmentation by-pass air flow-passage with a rearwardly-directed exhaust, is combined with a cascade valve mounted in a second, by-pass air flow-passage having a vertically-downward directed exhaust and thereby controlling the flow of by-pass air in the vertical flight mode.

1 Claim, 7 Drawing Figures

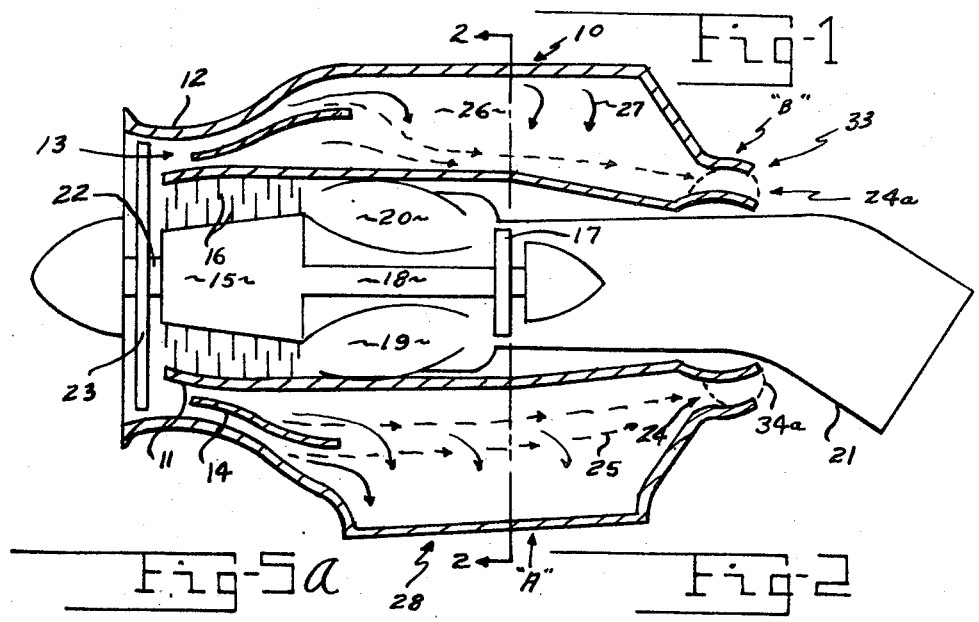
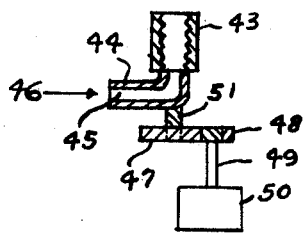
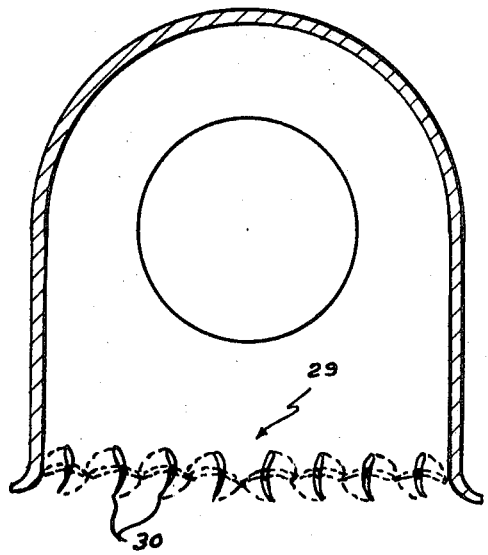
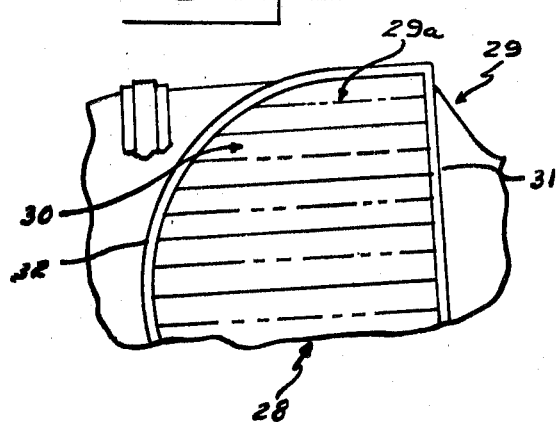

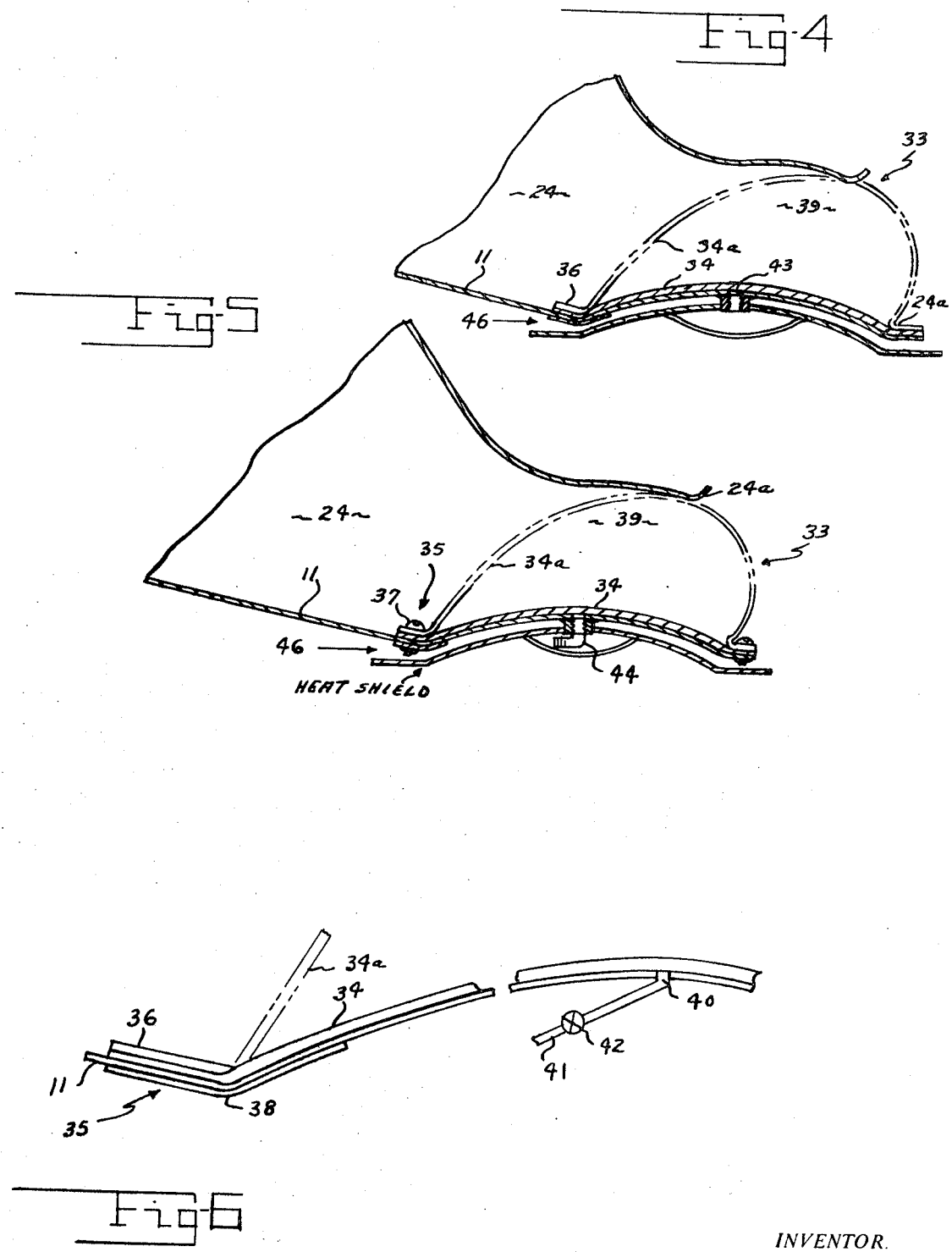

3,747,875

V/STOL AIRCRAFT-BY-PASS ENGINE HAVING A DOUBLE, THRUST DIVERTER VALVE ASSEMBLY

BACKGROUND OF THE INVENTION

This invention relates generally to the application of the by-pass or turbofan engine to VTOL and/or V/STOL aircraft and, in particular, to an improved thrust diverter valve assembly therefor.

Because of the faster speeds and therefore landing and takeoff distances required for the more or less conventional types of jet aircraft, there has been a growing interest in, and development for many years of both the vertical-takeoff-and-landing (VTOL) aircraft and the short-takeoff-and-landing (STOL) aircraft. Many forms of the VTOL aircraft have STOL characteristics and therefore may be properly referred to as a V/STOL aircraft. Of course, concurrent with the development of the aircraft itself has been the simultaneous or almost simultaneous development of a suitable power plant. Basically, four general types of VTOL and V/STOL propulsion systems have been generally proposed; namely, the rotor, propeller, ducted fan and turbojet engine systems. In this connection, the turbofan or, by-pass engine, as it is referred to hereinafter in connection with the present disclosure, is properly considered as being a modified turbojet rather than a ducted fan-type engine. In the usual type of turbofan or by-pass engine, the primary thrust created by the exhaust of hot combustible products from the main, turbojet engine portion may be augmented, as is well-known, by the provision of a flow of bypass or secondary air through a bypass, annular passage or chamber concentrically arranged to the main engine. The circumferential portions of a fan member, mounted just forward of, or integrated with the engine compressor section, are used to and in directing this bypass or secondary air flow into the bypass passage or chamber. With such a bypass passage arrangement, the propulsive efficiency of the pure turbojet engine is greatly increased in the relatively low speed ranges and is, therefore, particularly applicable to the VTOL, STOL and V/STOL-types of aircraft. Accordingly, the usual by-pass engine has been modified, in accordance with the teachings of the present invention, to be described hereinafter, for particular application to VTOL and/or V/STOL aircraft, by the incorporation of a dual-annular passage system that includes a VTOL outlet for vertical or substantially vertical flight. In this connection, the present invention constitutes a further development and improvement of previously-conceived by-pass engines described and claimed by the present applicant in copending patent application Ser. No. 77,776, filed Oct. 5, 1970, now U.S. Pat. No. 3,660,981 on an invention entitled, "The V/STOL Aircraft", and patent application, Ser. No. 193,436, filed Oct. 28, 1971, on an invention entitled, "By-Pass Engine Having a Single, Thrust Diverter Valve Mechanism for a V/STOL Aircraft". The improvement of the present invention will appear self-evident hereinafter in the following summary and detailed description thereof.

SUMMARY OF THE INVENTION

This invention consists briefly in an improved thrust diverter means for a by-pass engine having a main, thrust-producing turbojet engine portion, a by-pass annulus surrounding the main, turbojet engine portion, a fan for directing a by-pass or secondary air flow into the inlet of the by-pass annulus, a pair of annular flow passages surrounding the turbojet engine portion and in respective communication with the outlet of the by-pass annulus, and respectively incorporating rearwardly and vertically downwardly-directed exhaust passage means for either augmenting the forward thrust of the main engine portion, or to convert the engine to the vertical-takeoff-and-landing configuration. The said thrust diverter means includes a dual arrangement consisting of a cascade or venetian-blind type of valve assembly adjustable to an open or closed position within the annular passage having the vertically downwardly-directed exhaust means, and an inflatable valve assembly in unique combination therewith, and adjustable either to an inflated or deflated position within the other annular passage to thereby control and thus provide thrust-augmentation to the main engine portion during the forward flight mode of engine operation.

Certain advantages, as well as objects, of the present invention will become readily apparent hereinafter from the following disclosure thereof, taken in connection with the accompanying drawings, in which:

BRIEF DESCRIPTION OF THE DRAWINGS

FIG. 1 is a longitudinal sectional and partly schematic view, illustrating the overall configuration of one form of bypass engine in which the improved double, thrust diverter valve assembly of the present invention may be applied;

FIG. 2 is a broken-away, partly schematic and cross-sectional view, taken about on line 2—2 of FIG. 1, showing details of the cascade or venetian blind-type of valve mechanism forming part of the inventive double, thrust diverter valve assembly and controlling the flow of secondary or by-pass air through the vertical flight mode-outlet of the present engine;

FIG. 3 is a second broken-away view, partly schematic in form and looking in the direction of the arrow "A" in FIG. 1 to illustrate additional details of the cascade or venetian blind-type of valve mechanism of FIG. 2;

FIG. 4 is a relatively enlarged, partly broken-away and fragmentary view, illustrating details of the novel inflatable valve mechanism of the present assembly, which valve mechanism has been generally indicated as being positioned in the present by-pass engine at the area marked "B" in FIG. 1;

FIG. 5 is another relatively enlarged, partly broken-away and fragmentary view, showing still further details of the inflatable valve mechanism of FIG. 4;

FIG. 5a is an additional partly schematic and cross-sectional view, more clearly showing one form of bleed air inlet and vent member used to control the inflation and deflation of the inventive inflatable valve member; and FIG. 6 represents still another relatively enlarged, partly broken-away and fragmentary view, more clearly illustrating the attachment means between the inflatable valve mechanism of FIGS. 4 and 5 and the wall of the by-pass passage or chamber in which it is mounted.

DESCRIPTION OF THE PREFERRED EMBODIMENT

Referring particularly to FIG. 1 of the drawings, a by-pass fan-type of turbojet engine in which the improvement of the present invention may be applied is indicated generally at 10 as including, in part, an inner shell 11, and an outer shell 12 between which is formed a by-pass annulus at 13. A diffuser member at 14 may be positioned in the by-pass annulus 13 for the usual purpose. Enclosed within the inner shell 11 may be positioned a pure turbojet engine portion comprising the compressor section that includes the main, compressor support-member at 15 and the plurality of alternately-disposed stator and rotor blade elements at 16, a turbine at 17, a rotatable shaft 18 on the opposite end portions of which may be rigidly supported the compressor support-member 15 and turbine 17, a pair of combustion chambers 19 and 20, and an exhaust or tail pipe section at 21.

A fan 23 may be mounted forwardly of, and for simultaneous rotation with, the compressor support-member 15, as by means of the stub shaft at 22. As clearly shown, the circumferential portions or periphery of the fan 23 extend in an overlapping relation to the inlet of the bypass annulus 13, so that rotation of the fan 23 acts to positively direct a flow of by-pass or secondary air into the said bypass annulus 13. Naturally, as in the usual by-pass-type of turbojet engine, a primary flow of air passes through the inlet of the compressor section 15, 16 and is thereafter directed downstream, in compressed form, for subsequent mixture and ignition with a supply of fuel in the combustion chambers 19 and 20. The hot products of combustion therefrom are then exhausted against the turbine 17, which then acts, through the shaft 18, to drive the compressor 15, 16. Of course, in other modifications of the by-pass engine, a two-spool compressor and a separate turbine for driving the fan 23 could be easily utilized without departing from the true spirit or scope of the invention. In any event, the hot combustible products, after having a portion of the energy thereof utilized for driving the compressor, are exhausted out the tail pipe section 21 to thereby provide the principal forward thrust of the engine.

The previously-described flow of bypass or secondary air entering the by-pass annulus 13 under the urging of the fan 23 may, in accordance with the unique teaching of the present invention, alternately pass into, and through one of two communicating, annular flow passages or chambers, indicated respectively at 24 and 26, and each of which incorporate inlet portions in open communication with the outlet from said by-pass annulus 13, at a different angular relation therewith, and which are further arranged in concentric relation relative to each other and to the main, turbojet engine-portion. Annular passage or chamber 24, which may be relatively elongated in form, incorporates a rearwardly-directed exhaust, indicated generally at 24a, that, in the forward flight mode of engine operation, permits the by-pass or secondary air to flow in the direction indicated by the broken arrows at 25 for its exhaustion in a rearward direction out the said exhaust 24a to thereby augment the forward thrust being developed in the main, turbojet engine portion.

For the vertical flight mode of engine operation, the previously-referred to annular passage or chamber 26, which is arranged further outwardly of, and in concentric relation to, the annular passage or chamber 24, may be relatively enlarged in configuration and incorporate a vertical-takeoff-and-landing (VTOL) outlet opening, indicated generally at 28, which outlet opening 28 is naturally oriented in a vertically-downward direction to thereby direct the flow of bypass or secondary air entering the bypass annulus 13 in the direction indicated by the solid arrows at 27.

To provide for the alternate flow of bypass or secondary air from the bypass annulus 13 to one or the other of the annular chambers 24, 26, the new and improved double, thrust diverter valve assembly of the present invention may be installed in the previously-described by-pass engine. The said double, thrust diverter valve assembly consists, in part, of a first, cascade or venetian blind-type of valve mechanism, indicated generally at the reference numeral 29 in both FIGS. 2 and 3 as being mounted in the VTOL-outlet opening 28. The mechanism 29 consists of a plurality of individual vane elements at 30 that are mounted for collective rotation between the opened position, shown in solid lines in FIG. 2, and the closed position of FIG. 3 to thereby completely block the flow of bypass or secondary air through the said VTOL-outlet opening 28. As seen in the latter figure, said vane elements 30 extend clear across outlet opening 28 and may be each rotatably mounted about a central axis, as shown at the reference numeral 29a, for example, which axis may be extended to opposite sides of the engine wall surfaces 31 and 32 incorporated within the present engine and forming the said outlet opening 28 therebetween. Of course, the vane elements 29 may be each attached, for example, to a relatively elongated, common rack lever (not shown) or to other suitable operating means, that may be engaged, for example, with a pinion gear mounted on the drive shaft of a motor under control of the aircraft pilot, copilot or other aircrew member. However, the specific operating means for rotating the vane elements 30 are not illustrated, since the specific details thereof are unimportant to the present invention.

In unique combination with the aforementioned first, cascade or venetian blind-type of valve mechanism, as at 29, that is utilized to control the vertical-takeoff-and-landing (VTOL) flight mode of engine operation, is a second, combined nozzle and valve mechanism, indicated generally at 33 in FIGS. 1, 4 and 5, which second, valve mechanism 33 is shown mounted in the previously-referred to first, relatively elongated, bypass or secondary air flow-passage or chamber 24 adjacent the exhaust 24a thereof for thereby controlling the by-pass or secondary air flow representing the forward thrust-augmentation flight mode of engine operation. For the latter purpose, the said second, combined nozzle and valve mechanism 33 uniquely consists of an inflatable nozzle/valve-diaphragm member 34, preferably made of a silicone rubber or, alternatively, it may be constructed from any other suitable inflatable material. In operation, said diaphragm member 34 is designed to be inflated from its relaxed or deflated condition, shown at the solid line position indicated at the said reference numeral 34, to the inflated condition, illustrated in dashed lines at 34a, which inflated condition, at 34a, acts, and is sufficient to completely block and seal-off the said first, bypass or secondary air flow-passage or chamber 24 so that no air will pass therethrough.

As is seen particularly in FIG. 6, for example, the periphery or circumferential portion of the aforementioned novel, combined, inflatable nozzle and valve-diaphragm member 34 may be rigidly supported and affixed to the outer surface of the inner shell 11 as by means of a combined diaphragm member-attaching and supporting means, indicated generally at 35 as consisting, in part, of a ring-like retainer element at 36 that is positioned on top of the diaphragm member-periphery or circumferential portion. The latter may be bonded to the ring-like retainer element 36 in any suitable manner, and the said ring-like retainer element 36, together with the diaphragm member-periphery or circumferential portion may, in turn, be collectively rigidly affixed to the inner shell 11, as by means of the bolt-attachment at 37 (Note FIG. 5). To provide further reinforcement and a more stable attachment, for the bolt-attachment 37, the combined attaching and supporting means 35 further includes a reinforcing back support member, as depicted at 38 in FIG. 6, to which the said bolt-attachment 37 may also be affixed.

To provide for the necessary inflation of the diaphragm member 34, when it is desired to perform the VTOL mode of operation of the present engine, a source of compressed gas, such as air, may be supplied directly into the compartment 39, formed by the inflation of and enclosed within the inflated member 34, through a small opening, as seen at 40 in FIG. 6, for example, by means of a conduit 41, controlled by a valve at 42, connected to a suitable compressed air supply, such as that provided by the engine-compressor itself. Thus, compressor bleed air may be used for this purpose and, to this end, an inflate/deflate line comprising the internally-threaded and open passage-fixture element, seen at 43 in FIGS. 4 and 5a, may be mounted in the opening 40 that has been formed in the wall of the inner shell 11, as has been previously described in specific connection with FIG. 6. Said inflate/deflate line or fixture element 43 may be internally threaded and an externally threaded bleed air inlet and vent member, depicted at the reference numeral 44 in FIGS. 5 and 5a, may be adjustably positioned therewithin. As seen in the aforesaid FIGS. 5 and 5a, in one form thereof, the bleed air inlet and vent member 44 may be of an L-shaped or elbow configuration and it further incorporates an air passage or chamber at 45 that is open at both ends. Thus, cooling air, constituting the engine compressor bleed air and flowing in the direction of the arrow indicated at 46 in the said FIGS. 5 and 5a, would naturally enter the inlet of the air passage or chamber 45 (Note FIG. 5a) where it would pass through and act upon, and thereby cause inflation of the previously-described nozzle/valve-diaphragm member 34 to the dashed line position illustrated at 34a in FIGS. 1, 4 and 5. The latter position, of course, blocks the flow of bypass or secondary air through the annular passage 24. Of course, when it is desired to deflate the said diaphragm member 34 it is only necessary to stop the flow of the compressor bleed air into the chamber 39 formed by the inflated condition of the diaphragm member 34, and then provide for the venting of the compressed air from the chamber 39. Naturally, many different types of available valve control mechanisms could be used for this purpose without departing from the true spirit or scope of the invention. In the schematic and cross-sectional view of FIG. 5a, one form of control means for the diaphragm member 34 has been depicted. Thus, the mechanism provided in this arrangement consists of incorporating a stub shaft 51 extending from the bottom of the bleed air inlet and vent member 44, with a gear 47 shown affixed thereto and engaged with a pinion 48 mounted, in turn, on the drive shaft 49 of an electrical motor 50, which may be under control of the pilot or other aircrew member. Thus, operation of the motor 50 would result in the rotation of the bleed air inlet and vent member 44 from a first position shown in FIGS. 5 and 5a, wherein its inlet opening is facing directly in an upstream direction to thereby receive the compressed, engine compressor air directly thereinto, to a second position oriented at an angle of 180° to its first position and thereby facing directly downstream. With the latter orientation, it is obvious that no compressed air would flow into, and through the bleed air passage or chamber 45 to act upon and inflate the diaphragm member 34. On the contrary, the rapid flow of compressed air passed the bleed air inlet and vent member 44, which is now facing directly downstream, would cause a suction or negative pressure, resulting in the venting of compressed air in the compartment 39 through the said air passage or chamber 45, and thus the diaphragm member 34 would return to its deflated or solid line position of FIG. 5, for example, to open the annular passage or chamber 24.

To summarize the operation of the present invention, for the forward flight mode, the first, rotating cascade or venetian blind-type of valve mechanism 29 would be closed to the position indicated in FIG. 3, for example, and the nozzle/valve-diaphragm member 34 would be opened or, in other words, deflated to its solid line position. Thus, the by-pass or secondary air flow in the annular passage or chamber 26 would be blocked, and its flow through the passage or chamber 24 permitted to thereby provide thrust-augmentation to the principal forward thrust being developed by the main, turbojet engine portion. For the vertical flight mode, the aforesaid diaphragm member 34 would be inflated, as for example, in the manner previously described, to the dashed line position of FIG. 5, for example, to thereby block the flow of bypass or secondary air through the annular passage or chamber 24, and the cascade or venetian blind-type of valve mechanism 29 would be opened to thereby provide for the flow of bypass or secondary air through the annular passage or chamber 26 for exhaustion out the vertically-downwardly-directed outlet opening 28 to thus create vertical thrust.

I claim:

1. A by-pass engine comprising; a main, forward thrust-producing turbojet engine-portion including compressor, turbine and main exhaust sections for acting on, and producing the main, forward thrust of the engine from the hot combustible products of the mixture of fuel and a primary air flow there-through; a combined, forward thrust-augmentation and vertical-takeoff-and-landing thrust-producing portion including a by-pass annulus formed in concentric relation to, and between the casing of, said turbojet engine-portion, constituting an inner shell element, and an outer shell element, and having an upstream or inlet end portion open to the main air inlet of the engine and a fan for pressurizing, converting, and alternately directing and dividing a portion of the incoming air constituting a by-pass or secondary air flow, initially entering the said upstream or inlet end portion of said by-pass annulus, into one or the other of two flow paths respectively consisting of; a first, by-pass or secondary air flow-passage means disposed in concentric and surrounding relation relative to, and immediately outwardly of, said turbojet engine-portion and having a first, inlet end-passage portion in open communication with an upstream portion of said by-pass annulus for thereby receiving by-pass or secondary air flow therefrom, and a first, exhaust means incorporating a relatively narrow and arcuate-shaped, valve-outlet end passage portion, and further communicating and forming a first, substantially straight-through and horizontally-oriented flow path-passage with said first, inlet end-passage portion and the upstream portion of said by-pass annulus for thereby exhausting the by-pass or secondary air flow in a rearward direction substantially augmenting the main, forward thrust being produced by the said turbojet engine-portion; a second, separate by-pass or secondary air flow-passage means disposed in concentric relation further outwardly of said first-named passage means and having a second, inlet end-passage portion in open communication with the upstream portion of said bypass annulus at an angle to said first, inlet end-passage portion of said first-named passage means for thereby receiving by-pass or secondary air flow therefrom, and a second, exhaust means in communication and forming a vertically downwardly-directed flow path-passage with said second, inlet end-passage portion and the upstream portion of said by-pass annulus for thereby exhausting the bypass or secondary air flow in a vertically-downward direction representing the vertical-takeoff-and-landing mode of engine operation; and combined means for alternately and selectively directing the by-pass or secondary air flow entering said by-pass annulus into one or the other of said first and second-named, by-pass or secondary air flow-passage means to thereby either augment the main, forward thrust being produced in the engine, or to establish the vertical-takeoff-and-landing configuration thereof; said means comprising; a first, forward thrust-augmentation mechanism mounted for operation between open and closed positions in and thereby blocking and thus controlling the flow of by-pass or secondary air into, and through said first, by-pass or secondary air flow-passage means representing the forward thrust-augmentation mode of engine operation; and a second vertical thrust-producing mechanism mounted, and adjustable to open and closed positions within said second, bypass or secondary air flow-passage means to thereby control the flow of by-pass or secondary air through said second, separate air flow-passage means and second, vertically downwardly-oriented, exhaust means representing the vertical-takeoff-and-landing mode of engine operation; said combined means for alternately and selectively directing the by-pass or secondary air flow into one or the other of said first and second-named by-pass or secondary air flow-passage means comprising a double, thrust diverter valve assembly including a first, rotatable cascade valve consisting of a plurality of individual vane elements arranged in a venetian blind-type configuration and mounted for rotation between open and closed positions within said second, vertically downwardly-oriented, exhaust means, adjacent to the outlet therefrom; a second, elastic diaphragm-valve mounted within said first, horizontally-oriented, by-pass or secondary air flow-passage means at the relatively narrow and arcuate-shaped, valve-outlet end passage portion thereof, and adjustable by expansion between a first, inner, non-expanded and inoperative position adjacent to the inside diameter-surface of said arcuate-shaped, valve-outlet end passage portion, and a second, outer, expanded and operative, sealed position against the outside diameter-surface, and thereby precisely accommodating the arucate-shaped configuration of, and thus completely blocking said valve outlet end passage portion; compressed gas means communicating with, and thereby effective to inflate said second, elastic diaphragm-valve from its first, inner position to its second, outer expanded and operative position; and a combined, releasable mounting and supporting means for rigidly attaching the peripheral portion of the said second, elastic diaphragm-valve to the said inner shell element on the inside diameter-surface of the said relatively narrow and arcuate-shaped, valve-outlet end passage portion, and thereby positively providing for the outward inflation of the main, intermediate portion of the elastic diaphragm of the said second-named, valve into its expanded position against the outer diameter-surface of said last named, valve-outlet end passage portion; said valve-mounting and supporting means comprising; a ring-like element bonded to, and operative to rigidly maintain, said second, elastic diaphragm-valve-peripheral portion in sealed relation against the outer surface of said arcuate-shaped, inner shell element; a rigid, reinforcing back support member bonded to the inside surface of said inner shell element at a location thereat in direct alignment with, and thereby providing positive reinforcement to the said ring-like element and said valve-peripheral portion; and quick-releasable, bolt-attachment means for rigidly and releasably interconnecting said ring-like element to said elastic diaphragm-valve-peripheral portion and said reinforcing back support member for thereby both positively providing a rigid clamp on the said peripheral portion and simultaneously facilitating the disassembly and replacement thereof.

* * * * *